United States Patent [19]

Nowicki et al.

[11] Patent Number: 5,285,189
[45] Date of Patent: Feb. 8, 1994

[54] ABNORMAL TIRE CONDITION WARNING SYSTEM

[75] Inventors: Donald V. Nowicki, Lorain; Christopher A. Munroe, Norwalk, both of Ohio

[73] Assignee: Epic Technologies, Inc., Norwalk, Ohio

[21] Appl. No.: 699,758

[22] Filed: May 14, 1991

[51] Int. Cl.⁵ ............................................. B60C 23/00
[52] U.S. Cl. .................................. 340/447; 73/146.5; 200/61.22; 340/442
[58] Field of Search ............... 340/447, 445, 442, 438; 73/146.5; 116/34 R; 200/61.22; 455/99

[56] References Cited

U.S. PATENT DOCUMENTS

| | | |
|---|---|---|
| 3,938,077 | 2/1976 | Nakanishi et al. |
| 3,950,726 | 4/1976 | Fujikawa et al. |
| 4,048,614 | 9/1977 | Shumway |
| 4,075,603 | 2/1978 | Snyder et al. |
| 4,090,172 | 5/1978 | Vesnic |
| 4,117,452 | 9/1978 | Snyder et al. |
| 4,131,877 | 12/1978 | Stewart et al. ............ 340/445 |
| 4,160,234 | 7/1979 | Karbo et al. |
| 4,210,898 | 7/1980 | Betts |
| 4,237,728 | 12/1980 | Betts et al. |
| 4,286,253 | 8/1981 | Nagy |
| 4,311,985 | 1/1982 | Gee et al. ............ 340/447 |
| 4,384,482 | 5/1983 | Snyder |
| 4,455,682 | 6/1984 | Masters |
| 4,507,956 | 4/1985 | Schlesinger et al. |
| 4,510,484 | 4/1985 | Snyder |
| 4,511,869 | 4/1985 | Snyder et al. |
| 4,531,112 | 7/1985 | Thomas ............ 340/447 |
| 4,695,823 | 9/1987 | Vernon ............ 340/447 |
| 4,909,074 | 3/1990 | Gerresheim et al. ............ 340/445 |
| 4,970,491 | 11/1990 | Saint et al. ............ 340/447 |
| 5,001,457 | 3/1991 | Wang ............ 340/447 |
| 5,061,917 | 10/1991 | Higgs et al. ............ 340/447 |
| 5,109,213 | 4/1992 | Williams ............ 340/447 |

Primary Examiner—Brent Swarthout
Attorney, Agent, or Firm—Fay, Sharpe, Beall, Fagan, Minnich & McKee

[57] ABSTRACT

A device is provided for sensing the condition of a pneumatic tire preferably of the type used on an automobile wherein the tire is mounted on a tire rim. The device comprises a housing, a band for mounting the housing to the tire rim, a sensor for monitoring the condition within the tire, circuitry operatively connected to the sensor for generating radio signals indicative of the tire condition, a power supply operatively connected to the circuitry, a centrifugal switch, and a receiver for receiving the radio signals. The centrifugal switch may be bypassed with the condition sensor switch to generate the radio signals when the pneumatic tire is stationary. Otherwise, the circuitry within the housing remains disabled until such time as the centrifugal switch senses a rotational frequency above a predetermined level. The circuitry is provided with a microcontroller operable between an active and a low power consumption mode wherein the battery comprising the power supply is conserved. A watchdog arrangement between the radio receiver and transmitter provides for a self-checking feature to alert an operator of the automobile of possible fault conditions such as low battery or circuit malfunction.

10 Claims, 4 Drawing Sheets

ABNORMAL TIRE CONDITION WARNING SYSTEM

BACKGROUND OF THE INVENTION

This invention relates to the art of abnormal tire condition warning systems and particularly to battery powered systems.

Both over and under inflated conditions in pneumatic tires are a cause for excessive tire wear resulting in premature tire failure. Moreover, such under and over inflated tire conditions can have an adverse affect on the efficiency of operations of the vehicle as to both performance or handling as well as vehicle fuel mileage. Since such conditions and results have been well known for quite some time, there have been many attempts to develop and provide means for automatically detecting and reporting them. Recently, development efforts for a practical and inexpensive device have become more concentrated due to the rise in fuel and tire costs as well as vehicle operation costs in general. Safety continues also to be an important consideration.

While there have been quite a number of prior devices developed and utilized for detecting tire inflation conditions, these prior devices have had structural or operational shortcomings rendering them undesirable or impractical for widespread use. While the specific prior devices may have been many and varied, many have required special wiring and the like extending from the wheel assemblies to the vehicle chassis and then through the vehicle body to the instrument panel. Such wiring adds undesired cost to the system and moreover, is extremely difficult and time consuming to install. Such installation time is particularly important when considered on the basis of installing the devices during original vehicle assembly for making them a part of the original vehicle equipment. Further, the necessary special wiring and associated equipment extending between the wheels and chassis are such that they are susceptible to damage or breakage from road materials, weathering, and the like encountered during normal vehicle use.

There have also been some prior art attempts at developing a detector apparatus self-contained in the wheel assembly to eliminate the necessity for wiring and the like such as the piezoelectric reed transducer power supply system as disclosed, for example, in U.S. Pat. Nos. 4,384,482 and 4,510,484. These devices, associated with a radio transmitter in the wheel assembly and a radio receiver for supplying information to the driver have proven to be effective, but still exhibit characteristics inherent to the piezoelectric reed generators such as slow energy start-up activation, relatively large unit size requirements, expensive costs, and potential variations between individual units. Each of these characteristics can lead to certain operational problems and provide for added costs for the overall system.

Still other systems have attempted to use a battery mounted in-wheel for supplying power to the transmitter. These systems, however, have suffered problems including the size of the battery and the associated operational life of the battery. A battery that could supply the needed energy was impractical due to its size and weight, and a battery with practical physical specifications lacked the energy storage capacity required to provide an adequate continuous service duration and other features often demanded of such a system. With the system being mounted in-tire, frequent battery replacement is very expensive when considering tire dismounting/mounting, wheel balancing, and the cost of the replacement batteries themselves.

BRIEF SUMMARY OF THE INVENTION

In accordance with the present invention, there is provided a self-contained device for sensing a condition of a pneumatic tire preferably of the type used on motor vehicles wherein the tires are mounted on tire rims. The device is provided with: a housing; a means for mounting the housing to a rim and within a tire; sensing means associated with the housing for monitoring a condition within the tire; circuit means associated with the housing including a microcontroller and a radio transmitter circuit operatively connected to the sensing means for generating radio signals indicative of a tire condition; power supply means associated with the housing, operatively connected to the circuit means, to power the circuit means, said power supply means including a battery and a centrifugal switch means adapted to energize the circuit means in a first tire rotation mode and de-energize the circuit means in a second tire rotation mode; and, means for receiving said radio signals.

In accordance with another aspect of the present invention, there is provided an in-tire self-contained device for sensing an abnormal condition of a pneumatic tire as set forth above wherein the microcontroller enters a "sleep" mode in which the microcontroller requires low battery power in operation.

In accordance with yet another aspect of the present invention, there is provided an in-tire self-contained device for sensing an abnormal condition of a pneumatic tire as set forth above further including a switching circuit operatively connected to the sensing means for bypassing the centrifugal switch means upon the indication of an abnormal tire condition.

In accordance with still another aspect of the present invention, there is provided an in-tire self-contained device for sensing an abnormal condition in a pneumatic tire as set forth above further including self-checking means to verify device operation.

One benefit obtained by an embodiment of the present invention is a self-contained abnormal tire condition sensing device located within the tire which is compact, reliable, and nearly maintenance-free.

Another benefit obtained by an embodiment of the present invention is an abnormal tire condition sensing device which has a self-checking feature to ensure the device is operational.

Still another benefit obtained by an embodiment of the present invention is an abnormal tire condition sensing device which provides immediate information on the condition of a tire upon ignition start-up and prior to the vehicle being put into motion.

Other benefits and advantages of the various embodiments of the present invention will become apparent to those skilled in the art upon reading and understanding of the specification below.

BRIEF DESCRIPTION OF THE DRAWINGS

The invention may take physical form in certain parts and arrangements of parts, the preferred embodiments of which will be described in detail in this specification and illustrated in the accompanying drawings which for a part hereof and wherein.

DETAILED DESCRIPTION OF THE INVENTION

Figure 1:
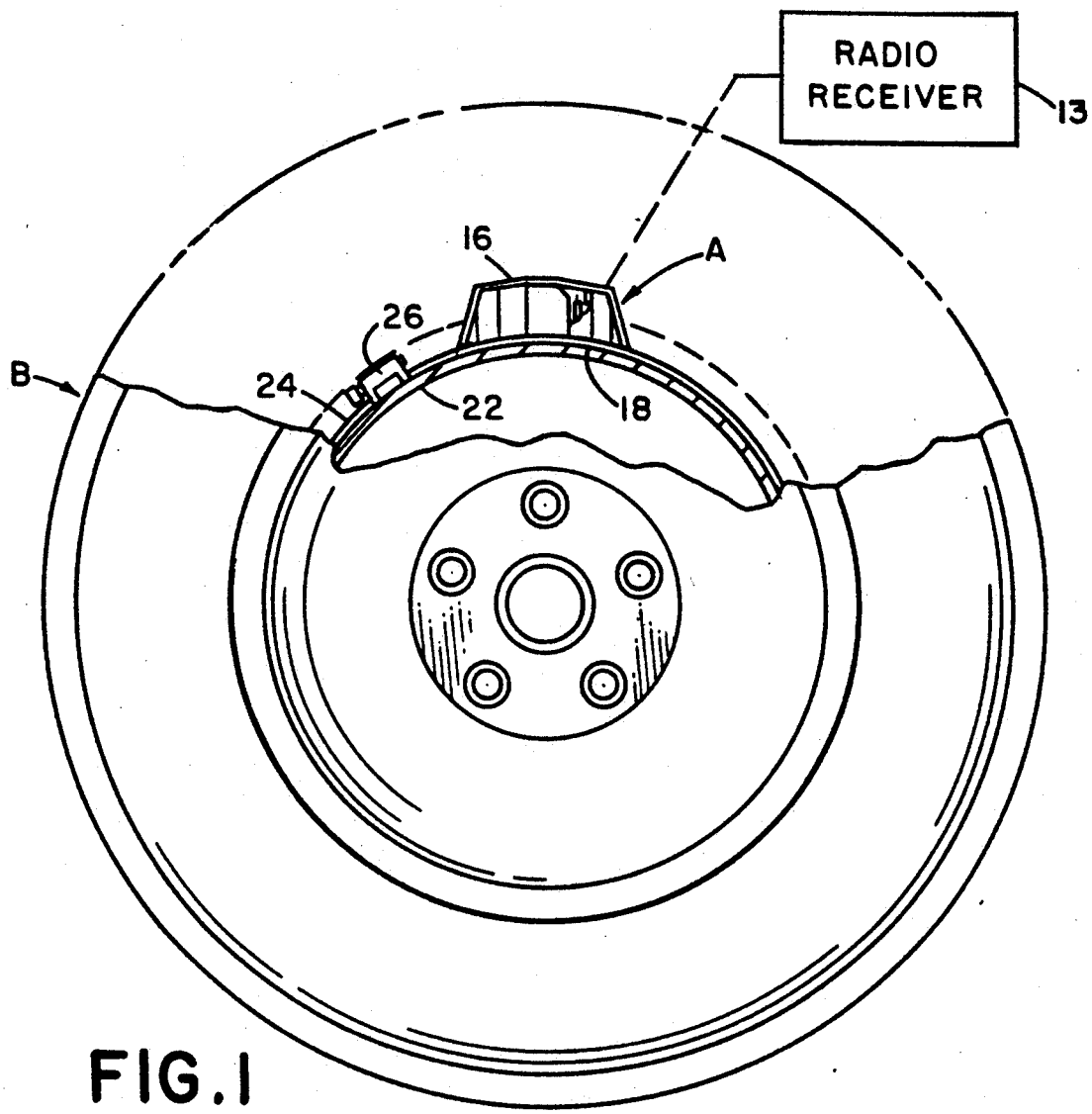
FIG. 1 is a side elevational view in partial cross-section of a vehicle wheel assembly having the radio transmitter device of the present invention installed thereon and operatively connected to a radio receiver.

Referring now to the drawings which are for the purposes of illustrating the preferred embodiments of the invention only and not for the purpose of limiting the same, the FIGURES show a radio transmitter device A adapted for mounting on a pneumatic vehicle tire B. The device A includes a radio circuit 10 a control circuit means 11, and a battery power supply means 12 for providing electrical energy to the circuit.

Figure 2:
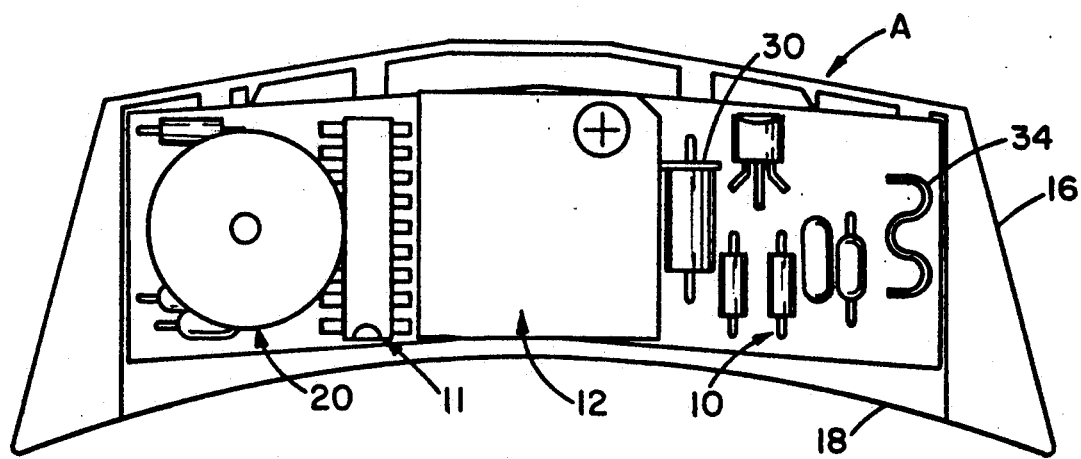
FIG. 2 is an enlarged cross-sectional view of the device shown in FIG. 1.

More specifically and with reference to FIGS. 1 and 2, transmitter package A includes radio transmitter 10 for use in an abnormal condition tire warning system. A tire condition sensor 20 senses when the tire is in an abnormal condition and, in association with control means 11 and radio circuit 10 powered by battery means 12, initiates an identifying signal to an associated receiver 13 in the form of an identification code, as diagrammatically shown in FIG. 1. The radio circuit 10, control means 11, sensor 20, and battery means 12 are contained in a housing 16 typically of plastic or the like, including a base wall 18 which is configured for close reception against the wheel rim 22 in the tire wheel cavity. Typically, the housing 16 is attached by means of a band 24 and adjustable tightening means 26, as are known in the art.

Figure 3:
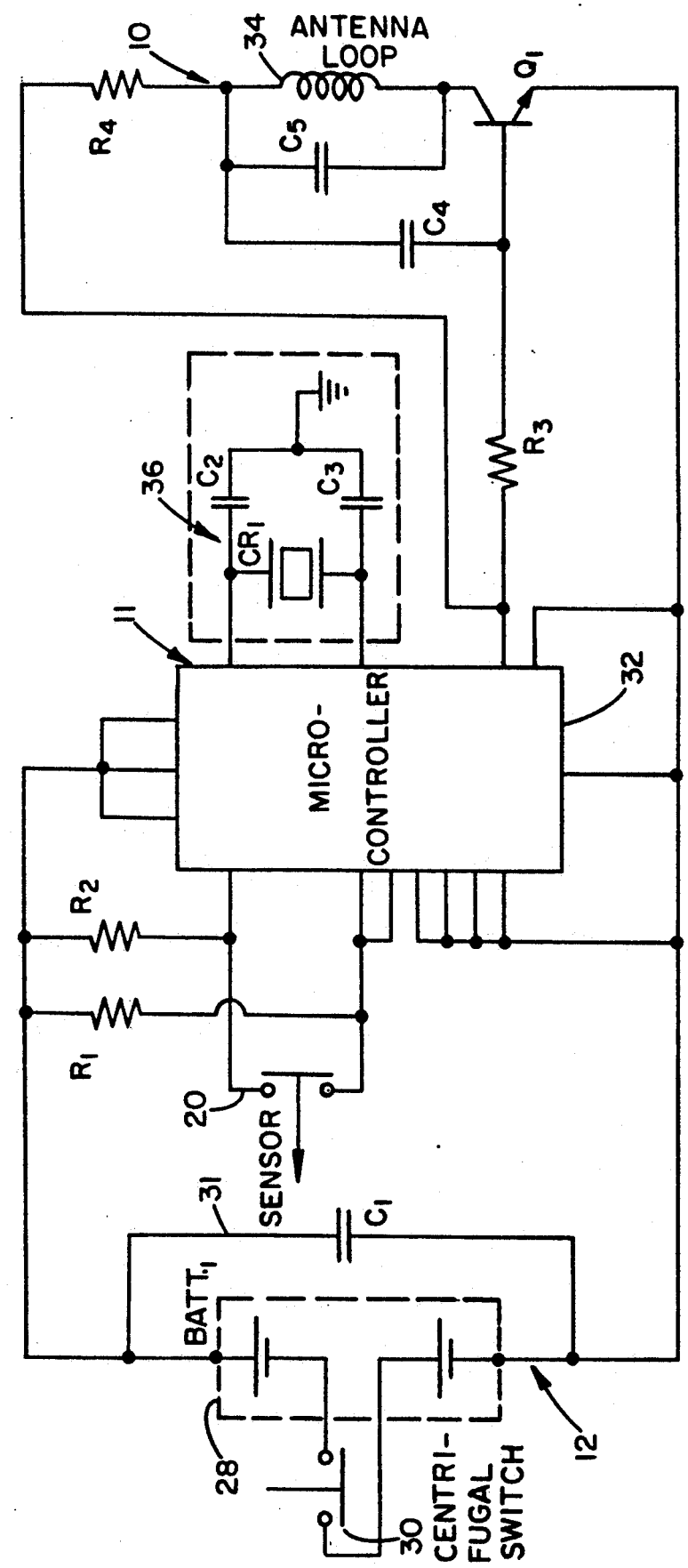
FIG. 3 is an electronic schematic diagram of the device shown in FIG. 1.

With reference to FIG. 3, power supply means 12 has a battery pair zs with a centrifugal switch 30 and associated circuitry 31. Centrifugal switch 30 is series-connected with the batteries so that the current path is open between the battery pair 28 and the radio circuit 10 whenever the car is stationary or moving at a rate of speed below some predetermined level, such as five miles per hour. That is, the centrifugal switch is oriented such that its contacts remain open until the centrifugal force generated on housing 16 by a rotating wheel exceeds a predetermined threshold level, at which point the contacts close to complete the circuit allowing energizing of circuit 10 through control means 11. By using the centrifugal switch 30 in this manner, the load is electrically removed from across the batteries when the wheel is stationary or operated below a predetermined speed. The centrifugal switch arrangement also provides a means to automatically disable the control circuit and radio transmitter whenever the unit is not in its normal pressurized environment, such as in shipping or upon discarding, thus conserving battery energy and eliminating a potential source of radio interference. A battery that has proven useful in this application is a Lithium-Carbon Monofluoride battery - LIFEX FB FB2325 H2, made by Rayovac Corporation, which has a small size and exhibits a low self-discharge rate with an extended operational temperature from below minus forty degrees Celsius ($-40°$ C.) to over eighty-five degrees Celsius ($85°$ C.) necessary for in-tire use.

Upon closure of the centrifugal switch, the batteries 28 power control means 11, including a microcontroller 32 which controls the pulse duration of the radio signal, repetition rate, and code patterns, for encoding the tire pressure and sensor identification information. In accordance with this invention, the microcontroller is of the type that has a low power consuming "sleep mode" within which only an internal timer remains active. This mode requires very little battery power. Microcontroller 32 is operationally connected to sensor 20, which typically is a pneumatic pressure switch selected to close at pressures above 25 psi. The microcontroller 32 is also connected to a radio frequency circuit 10 with antenna 34.

In operation, when continuously energized, the microcontroller periodically "wakes up" and executes resident firmware to check the state of its inputs, such as tire pressure and sensor identification. The microcontroller 32 then in turn outputs coded information to a radio frequency circuit 10 for transmission to radio receiver 13. The microcontroller runs for a short duration (less than 150 milliseconds) then goes into a multiple-second sleep mode which uses little energy. Typically, the duration of the sleep mode is twelve seconds and the energy usage in the sleep mode is less than 0.2 milliwatts. This sleep mode feature also spaces the individual transmissions about twelve seconds apart, which meets requirements set by the Federal Communications Commissions, and also minimizes spurious transmissions caused by momentary centrifugal switch closures. A microcontroller that has proven useful in the present application is an EPROM-based 8-BIT CMOS unit - PIC® 16C5X, made by Microchip Technologies Inc. This microcontroller includes the low current sleep mode feature.

In accordance with the present invention, a battery having a size for appropriate accommodation within a vehicle tire is provided with a centrifugal switch and microcontroller with low power sleep mode. By utilizing the low power consuming sleep mode of the microcontroller and the centrifugal switch shut-off function, sufficient battery energy capacity is available to allow the system to signal periodically regardless of pressure, thus providing a "self-checking" feature for the system. That is, the system not only discriminates tire pressure data when "awake", but also transmitter and sensor identification codes on a vehicle, thereby providing the self-checking feature which alerts a driver of general system problems such as a low battery, or transmitter/sensor malfunction. This is accomplished by providing the receiver 13 with a free-running "watchdog" counter wherein successive transmissions of sensor identification codes serve to reset the counter preventing an alarm condition. If at any time the "watchdog" counter reaches its limit without a resetting transmission of sensor identification codes originating from any of the multiple sensors on the vehicle, an alarm is generated by the receiver 13 identifying a fault condition and its source. In short, a reliable abnormal tire condition sensing system is provided with a continuous self-checking system. The system has a long maintenance-free life, typically in excess of eight years of normal vehicle operation.

In one operating embodiment, the following exemplary components and circuit values were employed in the radio transmitter device of FIG. 3. These components and values are in no way to be deemed as the overall inventive concepts involved.

| Component | Description |
| --- | --- |
| R1, R2, | 100K OHM |
| R3 | 300K OHM |
| R4 | 1K OHM |
| C1 | 1 μF |
| C2, C3 | 100 pF |
| C4 | 47 pF |
| C5 | 10 pF |
| Q1 | NPN RF Transistor |
| CR1 | 1 MHZ Resonator |
| BATT1 | 6 Volt Battery |

Figure 4:
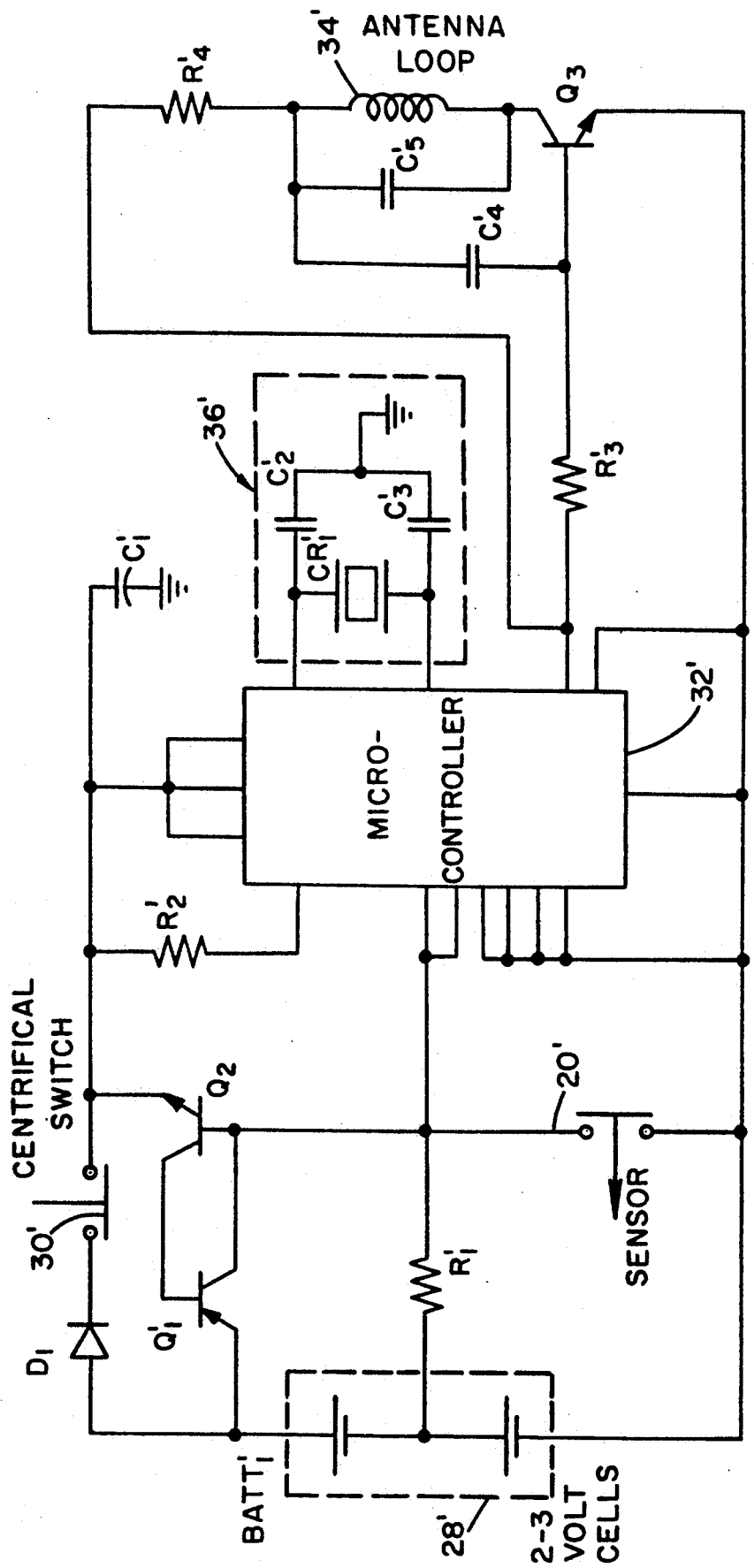
FIG. 4 is an alternate electronic schematic diagram of the device shown in FIG. 1; and, FIG. 5 is another alternate electronic schematic diagram of the device shown in FIG. 1.

FIG. 4 shows an alternate embodiment of the radio transmitter device of the present invention which is similar in operation and design to the device of FIG. 3, but includes additional instant abnormal tire indication. For ease of illustration, and discussion, like elements will be referred to by like characters with a primed (') suffix, and new elements will be referred to by new characters.

In this embodiment, the sensor pressure switch 20' is placed across batteries 28' to shunt the centrifugal switch 30' when pressure switch 20' indicates an abnormal tire condition. This provides for a signal even when the vehicle is not in motion. With this embodiment, the transmission of an abnormal tire condition such as pressure or temperature is provided to the driver instantly upon ignition start-up so long as the receiver module 13' (not shown) has power applied to it.

In this second operating embodiment of FIG. 4, the following exemplary components and circuit values were employed in the radio transmitter device. These components and values are in no way to be deemed the overall inventive concepts involved.

| Component | Description |
| --- | --- |
| R1' | 10M OHM |
| R2' | 100K OHM |
| R3' | 300K OHM |
| R4' | 1K OHM |
| C1 | 1 μF |
| C2', C3' | 100 pF |
| C4' | 47 pF |
| C5' | 10 pF |
| D1 | diode |
| Q1' | PNP Switching Transistor |
| Q2 | NPN Switching Transistor |
| Q3 | NPN RF Transistor |
| CR1' | 1 MHZ Resonator |
| BATT1' | 6 Volt Battery |

Figure 5:
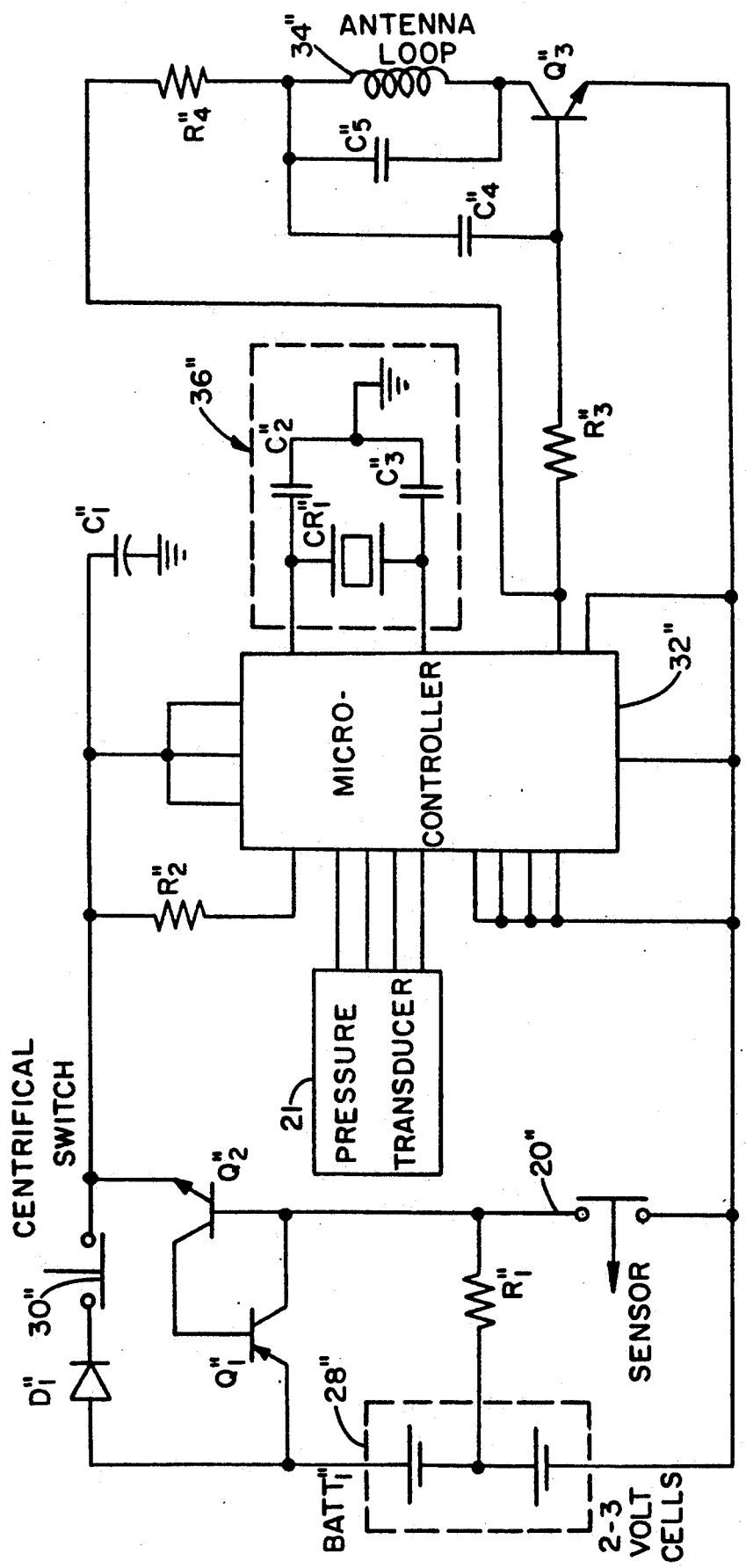

FIG. 5 shows yet another alternative embodiment of the present invention which is similar in operation and design to the device of FIG. 4, but includes means for actual tire pressure measurement indication. Such means could also provide for temperature measurement indication. For ease of illustration and discussion, like elements (FIGS. 3 and 4) will be referred to by like characters with a double primed suffix ("), and new elements will be referred to by new characters.

In this embodiment, a pressure transducer/conditioning circuit 21 as is known in the art is connected to the microcontroller 32" to provide for the ability to encode and deliver a direct pressure measurement to read out to the vehicle operator (i.e., 20 psi, 21 psi, etc.). The circuit 21 is connected to microcontroller 32" so that it is periodically energized upon command by the microcontroller when the microcontroller is activated by either one or both of the following conditions: (1) the tire rotation frequency exceeds a predetermined level closing the centrifugal switch 30", or (2) abnormal tire pressure, opening the contacts of sensor pressure switch 20". This embodiment provides for the transmission of actual tire pressure measurement data (or temperature data) even when the vehicle is not in motion where the tire is in an abnormal inflation condition. The tire pressure measurement data is provided to the vehicle operator instantly upon ignition start-up when an abnormal tire condition exists, so long as the receiver module is energized. A temperature transducer and necessary support circuit may be added along with the pressure transducer 21 to enable the microcontroller 32" to deliver both actual temperature and actual pressure information by multiplexing the two separate transducers.

This invention has been described with reference to certain preferred embodiments. Obviously modifications and alterations will occur to others upon reading and understanding of the specification. It is our intention to include all such modifications and alterations insofar as they come within the scope of the appended claims or the equivalents thereof.

What is claimed is:

1. A device for sensing a condition of a pneumatic tire comprising:

a housing;

means for mounting said housing within said tire;

sensing means associated with said housing for monitoring a condition within the tire;

circuit means associated with said housing including:

a radio transmitter circuit operatively connected to said sensing means for controlling and generating radio signals indicative of said tire condition; and, a microcontroller having a low power mode during operation of the device, means for monitoring device parameters and means for periodically generating said radio signals in an absence of an abnormal tire condition, thereby providing for self-checking of the device in operation;

power supply means associated with said housing operatively connected to said circuit means to power the circuit means and to enable the generation of the radio signals, said power supply means including a battery adapted to be contained within said tire and a centrifugal switch means adapted with said battery to render the circuit means de-energized in a first stationary and low tire rotation mode and energized in a second high tire rotation mode; and, means for receiving said radio signals.

2. The device of claim 1 wherein said microcontroller comprises means for selectively operating in said low power mode for nearly all the time it is energized in said second high tire rotation mode, said low power mode operating means having an internal timer which causes said microcontroller to wake up from said low power mode.

3. A device for sensing a condition of a pneumatic tire mounted on a tire rim comprising:

a housing;

a means for mounting said housing within said tire;

sensing means associated with said housing for monitoring said condition within the tire;

circuit means associated with said housing including:

a radio transmitter circuit operatively connected to said sensing means for controlling and generating radio signals indicative of said tire condition; and, a microcontroller having a low power mode during operation of the device, means for monitoring device parameters and means for periodically generating said radio signals in an absence of an abnormal tire condition, thereby providing for self-checking of the device in operation;

power supply means associated with said housing, opweratively connected to said circuit means to power the circuit means and to enable the generation of the radio signals, said power supply means including a battery adapted to be contained within said tire and a centrifugal switch means adapted to render the circuit means de-energized in a first stationary and low tire rotation mode and energized in a second high tire rotation mode;

switching circuit means operatively connected to said sensing means for bypassing the centrifugal switch means upon an indiction of an abnormal tire condition; and means for receiving said radio signals.

4. The device of claim 3 wherein said microcontroller comprises means for selectively operating in said low power mode for nearly all the time it is energized in said second high tire rotation mode, said low power operating means having an internal timer which causes said microcontroller to wake up from said low power mode.

5. The device of claim 3 further including a pressure transducer means associated with said housing operatively connected to said microcontroller for providing tire pressure measurement data to said microcontroller upon command from said microcontroller.

6. A device for sensing an abnormal condition of a pneumatic tire preferably of the type used on a motor vehicle wherein the tire is mounted on a tire rim comprising:

a housing;

a means for mounting said housing within said tire;

sensing means associated with said housing for monitoring the abnormal condition within the tire;

circuit means associated with said housing including a microcontroller and oscillator circuit and a radio transmitter circuit operatively connected to said sensing means for controlling and generating radio signals indicative of said abnormal tire condition, said microcontroller having a low power consumption mode, means for selectively operating in said low power consumption mode for nearly all the time energized, means for monitoring device parameters and means for periodically generating said radio signals in an absence of said abnormal tire condition, thereby providing for self-checking of the device in operation;

power supply means associated with said housing operatively connected to said circuit means to power the circuit means and enable the generation of the radio signals, said power supply means including a battery adapted to be contained within said tire and a centrifugal switch, the centrifugal switch adapted to render the circuit means de-energized in a first stationary and low tire rotation mode and energized in a second high tire rotation mode thereby with said microcontroller greatly limiting power required from the battery and increasing battery life; and means for receiving said radio signals.

7. A method of monitoring a pneumatic tire condition for use with an apparatus having a transmitter device including a power supply including a battery adapted for mounting in said tire, a centrifugal switch, a condition sensor, microcontroller with an extended low power consumption mode when energized during operation of the device, and a radio signal generating circuit, and a receiver device for receiving radio signals, the method comprising the steps of:

disposing the transmitter device within the pneumatic tire;

sensing a rotational frequency of the pneumatic tire with the centrifugal switch above a predetermined threshold rotational frequency;

enabling the microcontroller by connection to the power supply through the centrifugal switch when the sensed rotational frequency exceeds the predetermined threshold frequency;

using the microcontroller to monitor apparatus parameters; controlling the radio signal generating circuit to generate a first radio signal indicative of an abnormal tire condition;

sensing said pneumatic tire condition with the condition sensor;

controlling the radio signal generating circuit with the enabled microcontroller to periodically generate a second radio signal representative of the sensed pneumatic tire condition at a predetermined rate in an absence of an abnormal tire condition to provide a self-checking of the transmitter device; and receiving the generated periodic radio signal with the receiver device.

8. The method of monitoring a pneumatic tire condition according to claim 7, further comprising enabling the microcontroller by connection to the power supply using the condition sensor when the sensed pneumatic tire condition is within a predetermined range.

9. The method of monitoring a pneumatic tire condition according to claim 7, further comprising:

sensing pressure within the pneumatic tire;

encoding the generated second radio signal with tire pressure information and transmitter device identification information; and, receiving the encoded radio signal and decoding the tire pressure information and the transmitter device identification information with the receiver device.

10. The method of monitoring a pneumatic tire condition according to claim 9, further comprising:

controlling the radio signal generating circuit with the microcontroller to periodically generate the encoded radio signal at a first frequency;

receiving the periodic encoded radio signal with the receiver device; and, generating an alarm with the receiver device when the first frequency is less than said predetermined rate.

* * * * *